US012759531B2

(12) United States Patent
Lavertu et al.

(10) Patent No.: US 12,759,531 B2
(45) Date of Patent: Oct. 13, 2026

(54) HYBRID PROPULSION SYSTEM AND METHOD OF CONTROLLING SAME

(71) Applicant: Transportation IP Holdings, LLC, Norwalk, CT (US)

(72) Inventors: Thomas M. Lavertu, Ballston Lake, NY (US); Omowoleola C. Akinyemi, Clifton Park, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 764 days.

(21) Appl. No.: 17/650,143

(22) Filed: Feb. 7, 2022

(65) Prior Publication Data

US 2022/0153252 A1 May 19, 2022

Related U.S. Application Data

(63) Continuation-in-part of application No. 16/234,584, filed on Dec. 28, 2018, now abandoned.

(51) Int. Cl.

*B60W 20/15* (2016.01)
*B60W 10/06* (2006.01)
*B60W 10/08* (2006.01)
*G01C 21/34* (2006.01)

(52) U.S. Cl.

CPC ............ *B60W 20/15* (2016.01); *B60W 10/06* (2013.01); *B60W 10/08* (2013.01); *G01C 21/3469* (2013.01); *B60W 2510/0638* (2013.01); *B60W 2510/0666* (2013.01); *B60W 2510/244* (2013.01)

(58) Field of Classification Search

CPC ...... B60W 20/15; B60W 10/06; B60W 10/08; B60W 2510/0638; B60W 2510/0666; B60W 2510/244; G01C 21/3469

See application file for complete search history.

(56) References Cited

U.S. PATENT DOCUMENTS 8,447,511 B2 5/2013 Frese et al.
2002/0083701 A1* 7/2002 Igarashi ................ B60W 20/00 60/284
2010/0030447 A1 2/2010 Smyth et al.
(Continued)

OTHER PUBLICATIONS

U.S. Appl. No. 16/234,586, filed Dec. 28, 2018.

*Primary Examiner* — Anne Marie Antonucci
*Assistant Examiner* — Patrick M Brady
(74) *Attorney, Agent, or Firm* — K&L Gates LLP

(57) ABSTRACT

A system may include a computer to obtain orientation information of a determined travel route for a vehicle system that includes a first power source and a second power source. The computer may determine one or more energy requirements of a hybrid propulsion system based on the orientation information. The computer may generate a trip plan to control a performance parameter(s) of a hybrid propulsion system and control a stable low temperature combustion. The computer may select at least one of the first power source or the second power source to deliver the one or more energy requirements. A method may include obtaining the orientation information, determining the one or more energy requirements, generating the trip plan, and selecting at least one of the first power source or the second power source. A vehicle system may include a hybrid power source, an electric motor(s), and a computer.

17 Claims, 5 Drawing Sheets

(56) References Cited

U.S. PATENT DOCUMENTS

| | | | | |
|---|---|---|---|---|
| 2010/0174484 | A1* | 7/2010 | Sivasubramaniam | B61L 27/16<br>701/469 |
| 2011/0034282 | A1* | 2/2011 | Akutsu | B60K 6/365<br>475/5 |
| 2011/0238246 | A1 | 9/2011 | Martini et al. | |
| 2014/0005847 | A1 | 1/2014 | Melen | |
| 2016/0304083 | A1 | 10/2016 | Teraya et al. | |
| 2017/0130635 | A1 | 5/2017 | Smith et al. | |
| 2017/0217313 | A1* | 8/2017 | Hashimoto | B60L 3/003 |
| 2018/0050686 | A1 | 2/2018 | Alturi et al. | |
| 2018/0099656 | A1 | 4/2018 | Otsuka et al. | |
| 2018/0363577 | A1* | 12/2018 | Ulrey | F02D 13/0261 |
| 2019/0381991 | A1* | 12/2019 | Aldrich, III | B60W 20/15 |
| 2020/0207378 | A1 | 7/2020 | Lavertu et al. | |
| 2022/0153252 | A1 | 5/2022 | Lavertu et al. | |

* cited by examiner

HYBRID PROPULSION SYSTEM AND METHOD OF CONTROLLING SAME

CROSS-REFERENCE TO RELATED APPLICATIONS

This application is a Continuation-In-Part of U.S. application Ser. No. 16/234,584, filed 28 Dec. 2018, the entire content of which is incorporated by reference herein.

BACKGROUND

Technical Field

The disclosed subject matter relates generally to hybrid propulsion systems and more particularly to a hybrid vehicle system energy management system and to a method of controlling the system.

Discussion of Art

In operating a vehicle such as a locomotive, some of the factors that an operator typically takes into account include environmental conditions, grade or slope, track or path curvature, speed limits, vehicle size, weight of the cargo, and distribution of that weight. Operation of the vehicle may be determined in part by a locomotive control system configured to automatically accelerate and decelerate the vehicle.

The locomotive control system having, for example, a trip optimizing system may benefit from a database that depicts track or path features such as altitudes and terrain details and locations. Such features may be input to an optimizing program that includes locator elements to determine location of the locomotive, track characterization elements, sensors for measuring operating conditions, and the like. The optimizing program typically include locomotive power description, performance of locomotive traction transmission, consumption of energy from the engine fuel as a function of output power, and other system performance characteristics that may enable system performance to be modeled. The optimizing program may be an algorithm embodied within a processor to optimize performance about an objective function that may include, as examples, minimizing travel time, minimizing transitions between power settings (notches), and minimizing emissions, as examples.

In conventional hybrid locomotive systems with power supplied by an engine and a battery, a control system typically optimizes factors such as fuel consumption, NOx emission, state of charge of the battery, without accounting for fluctuation in power and torque requirements and other boundary conditions for operating with low temperature combustion at several different points along a route of travel. Further, traditional optimizing programs, if not explicitly formulated for a hybrid locomotive system operation, run the risk of operating the battery and the engine without prior knowledge of power and torque requirements for stable combustion in low temperature conditions along the route of travel leading to potentially higher fuel consumption and/or reduced component life.

There remains scope for improving energy efficiency in hybrid propulsion system optimizing programs.

BRIEF DESCRIPTION

In accordance with one example or aspect, a hybrid propulsion system may include a computer to obtain orientation information associated with a determined travel route for a vehicle system including a first power source and a second power source and determine one or more energy requirements of a hybrid propulsion system of the vehicle system. The one or more energy requirements may be based on the orientation information of the determined travel route. The computer may generate a trip plan used by the vehicle system to control one or more performance parameters of the hybrid propulsion system and control a stable low temperature combustion in the hybrid propulsion system as the vehicle system travels along the determined travel route and select at least one of the first power source or the second power source to deliver the one or more energy requirements of the hybrid propulsion system based on the trip plan.

In accordance with one example or aspect, a method may include controlling a hybrid propulsion system of a vehicle system may include obtaining orientation information associated with a determined travel route for the vehicle system. The vehicle system may include a first power source and a second power source. The method may include determining one or more energy requirements of a hybrid propulsion system of the vehicle system. The one or more energy requirements may be based on the orientation information of the determined travel route. The method may include generating a trip plan used by the vehicle system to control one or more performance parameters of the hybrid propulsion system and to control a stable low temperature combustion in the hybrid propulsion system as the vehicle system travels along the determined travel route. The method may include selecting at least one of the first power source or the second power source to deliver the one or more energy requirements of the hybrid propulsion system based on the trip plan.

In accordance with one example or aspect, a vehicle system may include a hybrid power source to provide power to drive the vehicle system via a power transmission line. The hybrid power source may include an internal combustion engine and one or more batteries. The internal combustion engine and the one or more batteries may be coupled to the power transmission line. The vehicle system may include one or more electric motors connected to the power transmission line, a selection device to selectively couple the one or more electric motors to the power transmission line, and a computer. The computer may obtain orientation information associated with a determined travel route and determine one or more energy requirements of the hybrid power source associated with the orientation information of the determined travel route. The computer may generate a trip plan used by the vehicle system to control one or more performance parameters of the hybrid power source and to control a stable low temperature combustion in the hybrid power source as the vehicle system travels along the determined travel route. The computer may select at least one of the first power source or the second power source to deliver the one or more energy requirements of the hybrid power source based on the trip plan.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
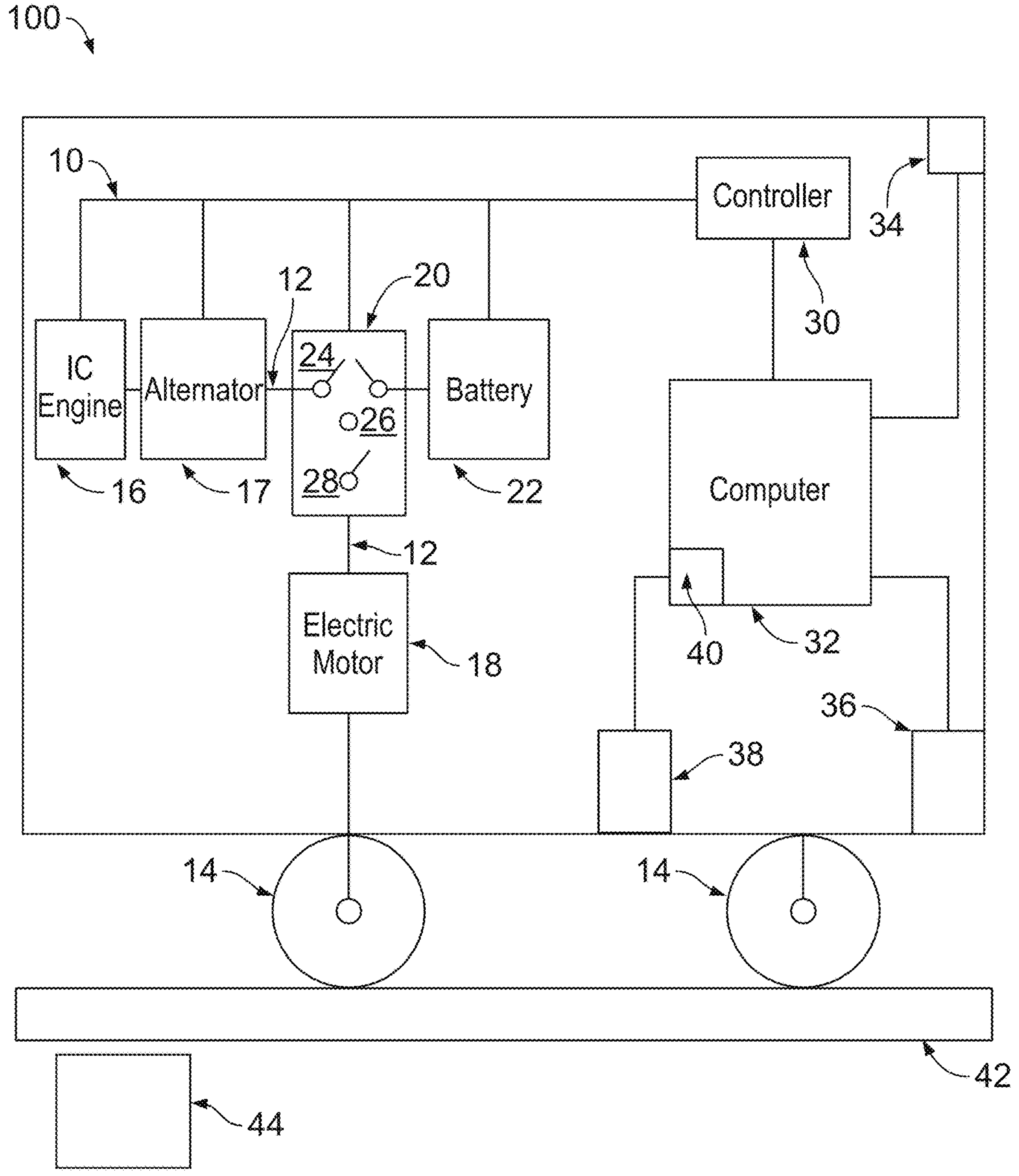
FIG. 1 schematically illustrates a hybrid propulsion system according to one embodiment.

Embodiments of the subject matter described herein relate to a hybrid propulsion system for a vehicle system that includes a first power source and a second power source. The first power source may be an engine, for example an internal combustion engine (ICE), and the second power source may be an onboard energy storage system, for example a battery, such as a bank of batteries. The second power source may be charged by the first power source, for example through an alternator and a set of switches. The wheels of the vehicle system may be driven by an electric motor(s). The electric motor may be powered by the first power source, for example through an alternator, and/or the second power source.

The hybrid propulsion system may include a computer to generate a trip plan for a determined travel route of the vehicle system. The computer may obtain orientation information regarding altitude and/or terrain during the determined travel route. The information may be obtained from previous trips or from communication with other vehicle systems and/or other locations, such as a central location (e.g., that dispatches vehicle systems) and/or a wayside location. The computer may also obtain other orientation information regarding the determined travel route, for example information regarding a condition of a route(s) (e.g., a track for a rail vehicle) during the trip. For example, the information may include a grade of a portion of the determined travel route or a speed limit of a portion of the determined travel route.

The computer may determine from the information portions of the trip that provide an opportunity to operate the first power source (e.g., ICE) in a low temperature combustion mode. Conditions that permit operation of the first power source in low temperature combustion mode include a required power and/or a required torque at a location(s) or during portions of the determined travel route. Operation of the first power source in a low temperature combustion mode improves the fuel efficiency of the first power source and reduces emissions (e.g., NOx and/or soot) of the first power source. The computer may generate a trip power source selection schedule that determines a first percentage of power and/or torque to be provided by the first power source and a second percentage of power and/or torque to be provided by the second power source to provide the total power and/or torque required that allows the first power source to operate in a stable low temperature combustion mode without excessive cylinder pressure, knocking, and/or misfiring. The computer may control intake conditions and/or engine operating conditions to allow operation in the stable low temperature combustion mode.

Further, embodiments are described with respect to a hybrid engine of a locomotive as non-limiting examples. The examples disclosed herein may be applied to hybrid propulsion systems in general. These exemplary hybrid propulsion systems include all-battery locomotives within a consist of standard locomotives, i.e., a battery-electric locomotive (BEL) setup, where the batteries are not integrated into a single locomotive. Further, a "vehicle" is used throughout this description, both as an individual integrated unit, and to a collection of multiple locomotives, one or more of which has energy storage that may or may not be integrated into one locomotive having both an engine and an energy storage unit. The definition of "vehicle" can additionally refer to heavy duty trucks wherein the energy storage units may be placed in a trailer that is connected to the tractor between the normal cargo trailers, essentially making it a "road train". In other words, the definition of "hybrid vehicles" include energy storage units that may not necessarily be integrated into the single power unit of a heavy-duty truck and rather can exist as separate, detachable, assets. Further, the definition of "vehicle" can additionally refer to any other vehicles including trucks/OHV/autos and autonomous vehicles. The "altitude and terrain" refer to and include the details associated with the tracks such as the grades, track radius on curves, etc. on which a vehicle system travels.

While one or more embodiments are described in connection with a rail vehicle system, not all embodiments relate to rail vehicle systems. Further, embodiments described herein extend to multiple types of vehicle systems. Suitable vehicle systems may include rail vehicles, automobiles, trucks (with or without trailers), buses, marine vessels, aircraft, mining vehicles, agricultural vehicles, and off-highway vehicles. Suitable vehicle systems described herein can be formed from a single vehicle. In other embodiments, the vehicle system may include multiple vehicles that move in a coordinated fashion. A suitable vehicle system may be a rail vehicle system that travels on tracks, or a vehicle system that travels on roads or paths. With respect to multi-vehicle systems, the vehicles can be mechanically coupled with each other (e.g., by couplers), or they may be virtually or logically coupled but not mechanically coupled. For example, vehicles may be communicatively but not mechanically coupled when the separate vehicles communicate with each other to coordinate movements of the vehicles with each other so that the vehicles travel together (e.g., as a convoy, platoon, swarm, fleet, and the like).

FIG. 1 illustrates a representative layout for a propulsion-generating vehicle 100 of a vehicle system. According to one embodiment, the vehicle system is a rail vehicle, such as a train, and the propulsion-generating vehicle is a locomotive. A hybrid propulsion system 10 of the vehicle system according to one embodiment includes an engine 16. The engine may be an internal combustion engine (ICE) that is configured to use a combustible fuel(s). The ICE may use, for example, diesel, hydrogen, or ammonia as a fuel. The ICE may be a dual fuel engine that operates on both gaseous and liquid fuel. According to one embodiment, the ICE is a dual fuel engine that uses diesel as a liquid fuel and hydrogen as a gaseous fuel. The hydrogen may be injected into the combustion chamber through an intake port of the ICE.

The ICE is connected to an alternator 17 that generates electrical power and supplies the electrical power to one or more electric (traction) motors 18 through a power transmission line(s) 12 and a bank of switching elements 20. The electric (traction) motor supplies the motive force to turn wheels 14 of the propulsion-generating vehicle. The electric (traction) motor is coupled to a battery 22 (e.g., a bank of batteries) by the bank of switching elements. The bank of switching elements includes a set of switches 24, 26, 28 configured to selectively couple: (1) the electric (traction) motor with the ICE (through the alternator), or (2) the electric (traction) motor to the battery, or (3) the electric (traction) motor to both the ICE and the battery. The set of switches are controlled by a controller 30 that is coupled to a computer 32.

Figure 2:
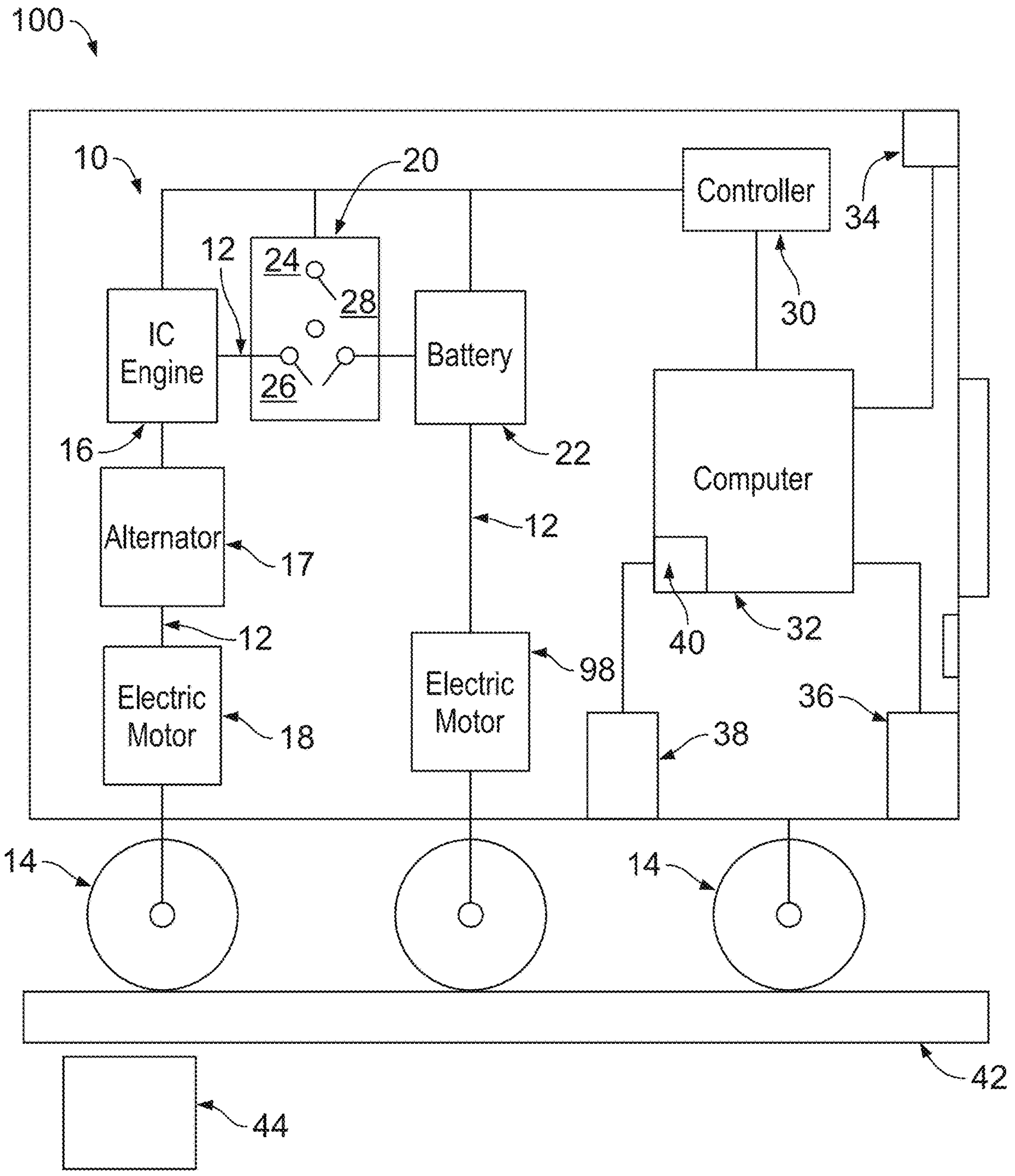
FIG. 2 schematically illustrates a hybrid propulsion system according to one embodiment.

Referring to FIG. 2, according to one embodiment, the ICE is coupled to the electric (traction) motor via the alternator by power transmission line. In operation, the set of switches of the hybrid propulsion system may selectively couple the electric (traction) motor either to the ICE via the alternator, or to the battery, or to both the ICE and the battery. By closing switches 24 and 26 and opening switch 28 the ICE is coupled to the electric (traction) motor and may impart power to the electric (traction) motor. Independently, by closing switches 24 and 28 and opening switch 26, the battery is coupled to a second electric (traction) motor 98 and may impart power to the second electric (traction) motor through a power transmission line(s).

According to one embodiment, for example in some passenger cars, the hybrid propulsion system may use a mechanical drive system in which the ICE may be connected to the electric (traction) motor via mechanical transmissions. In this embodiment, the set of switches may be mechanical clutches, gear trains, and the like, configured to impart mechanical power to the electric (traction) motor.

Figure 3:
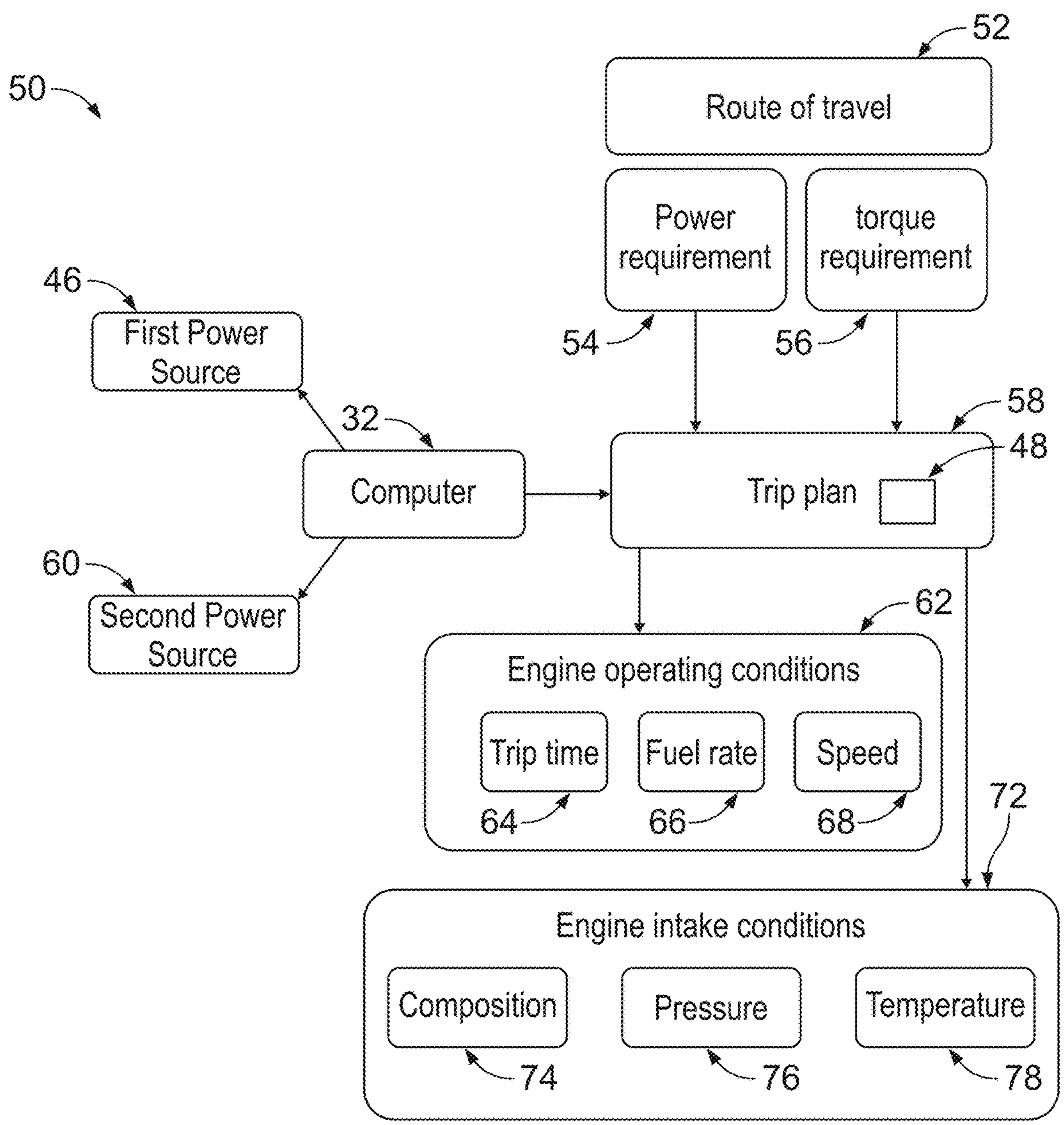
FIG. 3 schematically illustrates a system for controlling a hybrid propulsion system according to one embodiment.

The computer is configured to receive information from a locator element 34 (e.g., a GPS unit), a route (e.g., track) characterizing element 36, and sensors 38. A control algorithm 40 operates within the computer and is configured to generate a trip plan 58 (FIG. 3). The propulsion-generating vehicle including the hybrid propulsion system is operated over a route 42 (e.g., a track), and information may be transmitted to the hybrid propulsion system, for example via wireless communication, from a central or a wayside location 44. The control algorithm is configured to generate an optimized trip plan based on orientation information including altitude and terrain information along a determined travel route of the propulsion-generating vehicle. According to one embodiment, the control algorithm determines the power and torque requirements associated with locations along the planned route to maintain a determined total trip time. The control algorithm computes a trip plan based on the determined travel route, a number of low temperature combustion conditions such as power and torque requirements at several points along the determined travel route, the number of propulsion-generating vehicles in the vehicle system, a total load, and the like. The control algorithm also takes into account several other objectives of the trip that may include selection of power sources under varying low temperature combustion conditions, total trip time, maximum power setting, maximum speed limits, exhaust emissions, an amount of throttle transitions of the hybrid propulsion system, or the like.

Referring to FIG. 3, according to one embodiment, a system 50 is provided for controlling a hybrid propulsion system of a vehicle system that includes a first power source 46 and a second power source 60. According to one embodiment, the first power source is an engine (e.g., an ICE) and the second power source is a battery (e.g., a bank of batteries). The system includes a computer that is programmed to obtain orientation information including altitude and terrain information associated with a determined travel route 52 for the vehicle system. The computer is programmed to obtain low temperature combustion information associated with the determined travel route of the vehicle system. The low temperature combustion information includes information from a power requirement module 54 and a torque requirement module 56. The power requirement associated with the low temperature combustion condition may be a current power requirement and/or a forecasted or predicted power requirement. The torque requirement associated with the low temperature combustion condition may be a current torque requirement and/or a forecasted or predicted torque requirement.

The computer is programmed to generate the trip plan optimizing a number of performance parameters of the hybrid propulsion system as the vehicle system travels along the determined travel route and determine a first power required from the first power source (e.g., the ICE) and a second power required from the second power source (e.g., the battery) to implement the optimized trip plan. The computer is programmed to generate the optimized trip plan based on determination of a number of factors, including the power requirement along the determined travel route, the torque requirement along the determined travel route, the life of the first power source (e.g., the ICE), the life of the second power source (e.g., the battery), a charge state of the second power source (e.g. the battery), a total trip time, a maximum power setting, a speed limit, and an exhaust emission limits stipulated for the hybrid propulsion system. The life of the first power source (e.g., the ICE) may refer to a remaining useful life. The life of the first power source (e.g., the ICE) may refer to cumulative usage of the first power source. The maximum power setting may refer to a maximum power setting of the first power source (e.g., the ICE). According to one embodiment the first power source is an ICE and the maximum power setting refers to a maximum power where low temperature combustion is feasible. The maximum power setting may refer to the second power source (e.g., the one or more batteries). The exhaust emissions limits may refer to a total amount of emissions. According to one embodiment, the hybrid propulsion system includes a diesel and hydrogen dual fuel ICE as a first power source and the exhaust emission limits refers to a cumulative amount of CO2 emissions. The exhaust emission limits may refer to a rate of emissions of the hybrid propulsion system.

According to one embodiment, the performance parameters include engine operating conditions 62 and engine intake conditions 72. The engine operating conditions may include total trip time 64, fueling rate 66, and/or engine speed 68. The engine intake conditions may include intake composition 74, intake pressure 76, and/or intake temperature 78. According to one embodiment, the performance parameters may further include, locomotive power data, regenerative braking characteristics, performance of locomotive traction transmission, consumption of engine fuel as a function of output power, and cooling characteristics of the hybrid propulsion system, as examples.

According to one embodiment, the trip plan may be established based on models for vehicle system behavior as the vehicle system including the hybrid propulsion system moves along the determined travel route as a solution of non-linear differential equations derived from physics with simplifying assumptions that are provided in the control algorithm. The control algorithm has access to the information from the locator element, the track characterizing element, the determined travel route, the power requirement module, the torque requirement module, and/or the sensors to create the trip plan for minimizing fuel consumption while maintaining emissions within acceptable standards, establishing a desired trip time, and/or ensuring proper crew operating time.

The computer controls the set of switches according to the control algorithm as it follows the trip plan and engages and disengages the ICE from the power transmission line(s) and the electric (traction) motor(s) and/or engages and disengages the battery from the ICE, the alternator, or the wheels. According to one embodiment, the controller makes the vehicle system operating decisions autonomously. According to one embodiment, the vehicle system operator may be involved with directing the vehicle system to follow the trip plan. According to one embodiment, the computer utilizes the battery in such a way that the ICE operates at a constant speed and/or power with constant intake conditions. Operation of the ICE at constant speed and/or power enables stable low temperature combustion in the ICE.

According to one embodiment, the trip plan may be modified while being executed. Thus, an initial trip plan may be determined when a long distance is involved but owing to the complexity of the trip plan optimization control algorithm and changing conditions, the trip plan may be modified during the trip. The control algorithm may also be used to segment the mission by waypoints. According to one embodiment, more than one control algorithm may be used in series or in parallel.

In operation, as the vehicle system travels along the determined travel route, there may be conditions that allow the ICE to operate at low temperature combustion. The conditions that allow the ICE to operate at low temperature combustion may include the power requirement, the torque requirement, and/or a speed requirement of the vehicle system. The conditions may depend on the altitudes and/or terrain of the determined travel route. Low temperature combustion is possible up to a given engine load and speed. At particular combinations of engine load and speed, the intake pressure, temperature, and composition must all be within acceptable ranges to operate at stable low temperature combustion.

Low temperature combustion conditions pose several challenges to precise control of the operation of the ICE because small changes in combustion boundary conditions lead to unstable operation of the ICE. Possible changes in combustion boundary conditions include changes in intake conditions such as pressure and/or temperature and/or composition. Changes in the combustion boundary conditions may result in misfires, excessive cylinder pressure, and/or engine knocking. Further changes in combustion boundary conditions can include changes in engine operating conditions such as fuel rate and engine speed. According to one embodiment, a control strategy for the hybrid propulsion system under stable low temperature combustion includes using feed forward knowledge of the trip and knowledge of corresponding power requirement and/or torque requirement supplied by the ICE and by the battery throughout the trip. The trip can be planned and controlled to allow for time periods of operation of the ICE in stable low temperature combustion.

According to one embodiment, a control strategy adopted by the computer enables stable low temperature combustion. Knowledge of the determined travel route, including, for example, altitude and/or terrain information and expected weather (e.g., temperature) conditions, is combined with selection of the power and/or torque provided by the ICE and the power and/or torque provided by the battery to stabilize low temperature combustion in the ICE. The control strategy is used to maintain the combustion boundary conditions at stable points to enable stable low temperature combustion. Stable low temperature combustion may occur without misfires, excessive cylinder pressure, and/or engine knocking. According to one embodiment, stable combustion may occur when a rate of pressure rise in a cylinder of the engine is below about 3 bar per crank angle. A rate of pressure rise above about 3 bar per crank angle may lead to knocking of the engine. According to one embodiment, stable combustion may occur when a coefficient of variation (COV) of the indicated mean effective pressure is between about 3 to about 5. A COV of IMEP above about 5 may produce unstable combustion and lead to misfire. Feed forward knowledge of the trip along with the power available from the battery can be used to withstand fluctuations in the required power and/or torque from the ICE and let the ICE operate at a given set point. This allows for stable combustion boundary conditions and precise control of fueling, intake temperature, and intake pressure.

Operating an ICE in low temperature combustion allows for improved fuel efficiency and reduction of emissions such as NOx and soot. Low temperature combustion can be used in charged ignition (CI) engines operating in homogeneous charge compression ignition (HCCI) mode, pre-mixed charge compression ignition (PCCI) mode, and reactivity-controlled compression ignition (RCCI) mode. Low temperature combustion can be used in spark ignition (SI) engines operating in stratified charge spark ignition direct injection (SIDI) mode and homogeneous charge SIDI mode.

Figure 4:
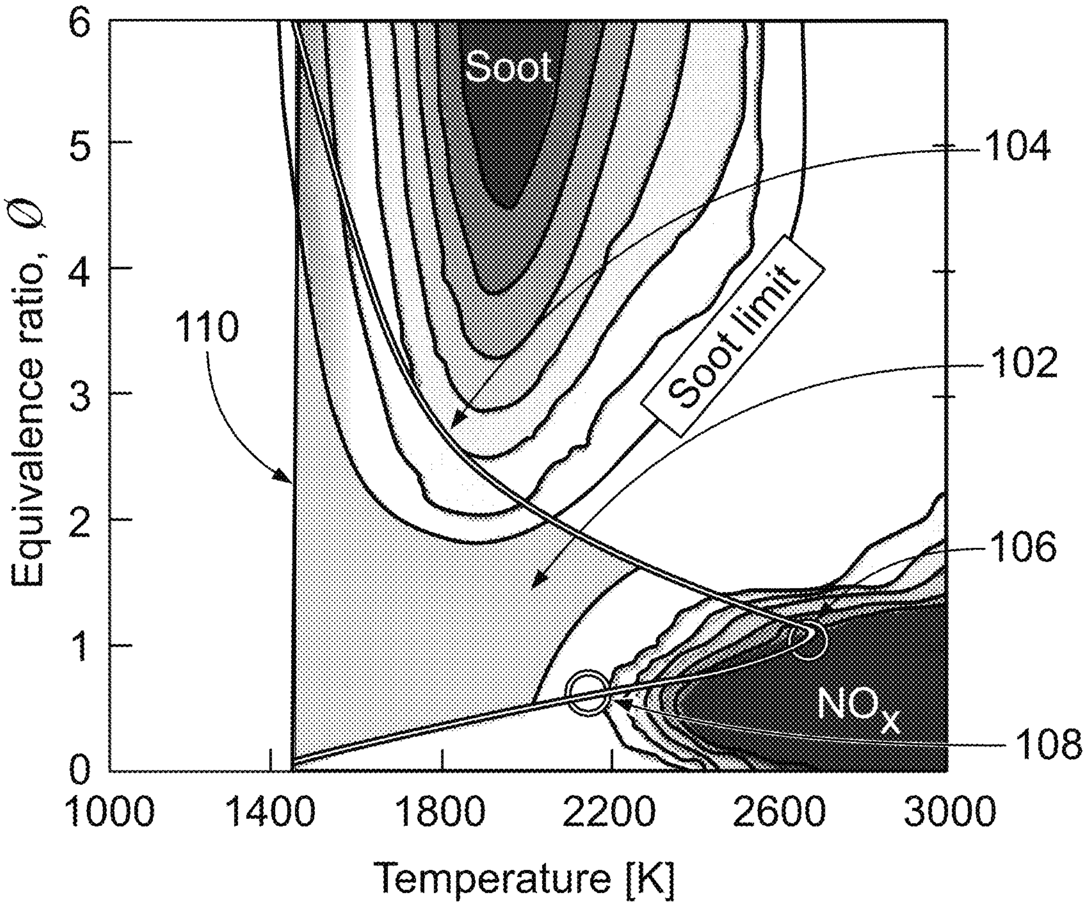
FIG. 4 schematically illustrates low temperature combustion conditions usable with disclosed embodiments.

Referring to FIG. 4, low temperature combustion may occur over a range of temperatures and equivalence ratios ($\varphi$). The equivalence ratio is the ratio of the actual fuel/air ratio of the fuel to the stoichiometric fuel/air ratio. Stoichiometric combustion occurs when all of the oxygen in consumed in the reaction and there is no molecular oxygen ($O_2$) in the combustion products. As shown, soot and NOx emissions may be formed during combustion under certain conditions of temperature and equivalence ratio. A low temperature combustion region 102 exists in which combustion occurs without high levels of soot and NOx production. The low temperature combustion region may exist within a region 104 of heterogeneous CI combustion that includes a plurality of combinations in the $\varphi$-T space. The low temperature combustion region does not extend to regions by a point 106 of homogeneous SI combustion having a fixed $\varphi$-T combination and a point 108 of lean burn homogeneous SI combustion having a fixed lean $\varphi$-T combination. The low temperature combustion region may have a low temperature range 110 defined by a temperature at which the conversion of CO to $CO_2$ diminishes.

Several parameters influence the initiation of combustion in a CI engine. Such recognized parameters include fuel type, compression ratio, intake charge temperature, oxygen concentration in the charge air, equivalence ratio, charge air density, and boost pressure. According to one embodiment, the control system is configured to control the initiation of combustion in an ICE in integration with orientation information including altitude and terrain information associated with a determined travel route for the vehicle system. According to one embodiment, the control system is configured to determine a power requirement and a torque requirement associated with several locations along the determined travel route and transition between the ICE and the battery to enable stable low temperature combustion and/or constant total trip time.

The trip plan may be generated based on an objective function that includes parameters such as the rate of power output from the ICE, the rate of power output from the battery, both as functions of combined power output, propulsion-generating vehicle (e.g., locomotive) power data, performance of vehicle traction transmission, cooling characteristics of the hybrid propulsion system, life of the ICE as the first power source, life of the battery as the second power source, a state of charge of the battery, total trip time, maximum power setting, speed limit, and exhaust emission of the hybrid propulsion system.

According to one embodiment, the computer may revise the trip plan based on low temperature combustion conditions that occur while the vehicle system is traveling from a first point to a second point. The computer is configured to obtain the altitude, terrain and low temperature combustion information from a location remoted from the vehicle system, for example from the wayside and/or central location. Instructions are input specific to planning a trip either onboard or from the remote location, such as a dispatch center with instructions. Such input information includes, but is not limited to, vehicle system position, propulsion-generating vehicle descriptions (e.g., one or more locomotives in succession), propulsion-generating vehicle power description, regenerative braking characteristics, performance of propulsion-generating vehicle traction transmission, consumption of engine fuel as a function of output power, cooling characteristics, the intended trip route (e.g., effective track grade and curvature as function of milepost or an "effective grade" component to reflect curvature following standard railroad practices), the vehicle system represented by vehicle makeup and loading together with effective drag coefficients, trip desired parameters including, but not limited to, start time and location, end location, desired total trip time, crew (user and/or operator) identification, crew shift expiration time, and route.

This data may be provided to the hybrid propulsion system in a number of ways, such as, but not limited to, an operator manually entering this data into the hybrid propulsion system via an onboard display, inserting a memory device such as a hard card and/or USB drive containing the data into a receptacle aboard the locomotive, or transmitting the information via wireless communication from the central or wayside location, such as a track signaling device and/or a wayside device, to the hybrid propulsion system. The hybrid propulsion system load characteristics (e.g., drag) may change over the route (e.g., with altitude, low temperature combustion, and condition of the rails and railcars), and the plan may be updated to reflect such changes as needed by, for example, real-time autonomous collection of vehicle system conditions. This includes, for example, changes in the hybrid propulsion system characteristics detected by monitoring equipment onboard or offboard the vehicle system.

Based on the specification data, an optimal plan which minimizes fuel use subject to speed limit constraints, emissions limits, life of the ICE as the first power source, life of the battery as the second power source, and/or the state of charge of the battery, along the route, with desired start and end times, is computed to produce a trip power source selection schedule 48. The trip power source selection schedule includes periods where selection of the power source is determined to take advantage of the prior knowledge of altitudes and terrains associated with the determined travel route and corresponding anticipated low temperature combustion conditions exemplified by the power and torque requirements along the determined travel route. The trip plan contains the selection schedule between the ICE and the battery along with optimal speed and power (notch) settings the hybrid propulsion system is to follow, expressed as a function of distance and/or time, and such vehicle system operating limits, including but not limited to, maximum power and brake settings, speed limits as a function of location, and the expected fuel use and emissions generated.

The procedure used to compute the power source selection schedule can be any number of methods for computing a power sequence that drives the hybrid propulsion system to minimize fuel subject to vehicle system operating conditions, life of the ICE as a first power source, life of the battery as the second power source, a state of charge of the battery, the emissions, schedule constraints, or the like. In some cases, the power source selection schedule may be close enough to one previously determined, owing to the similarity of the vehicle system configuration, route and environmental conditions. In these cases, it may be sufficient to look up the driving trajectory within a database of previously executed trip plans and follow it. When no previously computed trip plan is available or suitable, methods to compute a new one includes, but are not limited to, direct calculation of the power source selection schedule using differential equation models which approximate the vehicle system physics of motion. The setup involves selection of a quantitative objective function, or a weighted sum (integral) of model variables that correspond to total trip time, rate of fuel consumption, maximum power settings, speed limits, emissions generation, plus a term to penalize excessive throttle variation or jockeying, as examples.

Depending on planning objectives at any time, the problem may be setup flexibly to minimize fuel subject to constraints on emissions and speed limits, or to minimize emissions, subject to constraints on fuel use and arrival time, as examples. It is also possible to setup, for example, a goal to minimize the total trip time without constraints on total emissions or fuel use where such relaxation of constraints would be permitted or required for the mission.

Using this model, a control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

In operation, a control strategy is adopted for the hybrid propulsion system to supply its power and/or torque requirement either by the ICE or the battery or both, based at least partially on the low temperature combustion conditions (power and torque). Knowing the low temperature combustion conditions ahead of time, a trip plan can be put in place that preferentially use the battery and/or the engine power to reduce the fuel consumed and extend the life of the engine and/or the battery.

The computer is programmed to use the knowledge of an upcoming trip and anticipated low temperature combustion conditions along the determined travel route to select the source of power and/or torque from the ICE and/or the battery. For example, knowing the specific elevation or altitude requirements associated with a trip may typically give an indication of the ambient pressure along the determined travel route. According to one embodiment, the relevant control strategy may select to run the ICE relatively less at higher elevations and therefore conserve the battery for the same conditions. This can result in reduced engine component wear as higher elevations may stress components of the ICE (e.g., a turbocharger) more. Further, the ICE may not be as efficient at higher elevations and therefore, use of the battery instead of the ICE can result in improved fuel consumption. Similar tradeoffs can be made for variations in low temperature combustion conditions.

According to one embodiment, a control strategy may be to run the battery less at higher temperatures of the low temperature combustion region to extend the life of the battery. In other words, a given trip may run the battery only if needed and/or only when the temperature is not too hot or too cold. According to one embodiment, the control strategy may be to run the battery such that the ICE operates at a constant speed and/or a constant power while the intake conditions remain constant. According to one embodiment, instead of operating at discrete notch power settings, the computer selects a continuous power setting determined as optimal for the power source selection schedule selected. Thus, for example, if an optimal power source selection schedule specifies a notch setting of 6.8, instead of operating at a discrete notch setting of 7, the hybrid propulsion system operates at the notch setting of 6.8 to further improve efficiency thereof.

As used herein the term "emissions" refers to cumulative emissions produced in the form of oxides of nitrogen (NOx), unburned hydrocarbons, particulates, and/or the like by the ICE. If an objective during a trip mission is to reduce total emissions, for example to keep NOx below a determined level, control algorithm 40 may be generated or amended to consider this trip objective in conjunction with improved overall fuel efficiency. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

Referring again to FIG. 3, once the optimized trip plan is generated, power commands are generated to implement the trip plan. Depending on the operational set-up, one command is for the vehicle system to follow the optimized power command to achieve an optimal speed. The system obtains actual speed and power information from the hybrid propulsion system. Owing to the inevitable approximations in the models used for the optimization, a closed-loop calculation of corrections to optimized power is obtained to track the desired optimal speed. Such corrections of vehicle system operating limits can be made automatically or by the operator, who may have or assume control of the vehicle system.

In operation, the hybrid propulsion system continuously monitors system efficiency and continuously updates the trip plan based on the actual efficiency measured, whenever such an update would improve trip performance. Revising an existing trip plan or completely re-planning computations may be carried out entirely within the propulsion-generating vehicle(s) or fully or partially moved to a remote location, such as the central or wayside location where wireless technology may be used to communicate the updated trip plan(s) to the hybrid propulsion system. The control system may generate efficiency trends that can be used to develop vehicle system fleet data regarding efficiency transfer functions. The fleet-wide data may be used when determining the initial trip plan and may be used for network-wide optimization tradeoff when considering locations of a plurality of vehicle systems.

Many events in daily operations can lead to a need to generate or modify a currently executing trip plan, where it is desired to keep the same trip objectives, and for when a vehicle system is not on schedule for a planned meet or pass with another vehicle system and it needs to make up time. Using the actual speed, power and location of the vehicle system, a comparison is made between a planned arrival time and the currently estimated (predicted) arrival time, based on the remaining portion of the trip plan. Based on a difference in the times, as well as the difference in parameters, which may be detected and/or changed by dispatch or the operator, the trip plan is adjusted. This adjustment may be made automatically or manually made following a vehicle system's owner or operator's desire for how such departures from the trip plan should be handled. Whenever a trip plan is updated, such as but not limited to arrival time, additional changes may be factored in concurrently, e.g., new future speed limit changes, which could affect the feasibility of ever recovering the original plan. If the original trip plan cannot be maintained, or if the vehicle systems is unable to meet the original trip plan objectives, another trip plan(s) may be presented to the operator and/or remote facility (e.g., dispatch).

Revising an existing trip plan or completely re-planning may also be made when it is desired to change the original objectives. Such plan revision or complete re-planning can be done at either fixed preplanned times, manually at the discretion of the operator or dispatcher, or autonomously when predefined limits, such a vehicle system operating limits, are exceeded. If the current trip plan execution is running late by more than a specified threshold, thirty minutes as an example, according to one embodiment the computer can re-plan the trip to accommodate the delay based on minimizing total fuel consumption for the remaining portion of the trip, based on the new set of parameters. Other triggers for re-plan can also be envisioned based on the health of the power sources, time of arrival, loss of power due to equipment failure and/or equipment temporary malfunction (such as operating too hot or too cold), and/or detection of gross setup errors, such as in the assumed vehicle system load. That is, if the change reflects impairment in the hybrid propulsion system performance for the current trip, these may be factored into the models and/or equations used in the optimization.

Changes in plan objectives can also arise from a need to coordinate events where the plan for one vehicle system compromises the ability of another vehicle system to meet objectives and arbitration at a different level (e.g., the dispatch office) is required. For example, the coordination of meets and passes may be further optimized through vehicle system to vehicle system communications. As an example, if a vehicle system determines that it is behind in reaching a location for a meet and/or pass, communications from the other vehicle system can notify the late vehicle system (and/or dispatch). The operator can then enter information pertaining to being late in the computer and the control algorithm can recalculate the trip plan. The trip plan may be recalculated for optimizing and minimizing fuel consumption while taking advantage of planned regenerative braking. The control algorithm can also be used at a high level, or network-level, to allow a dispatch to determine which vehicle system should slow down or speed up should a scheduled meet and/or pass time constraint may not be met. This is accomplished by the vehicle systems transmitting data to the dispatch to prioritize how each vehicle system should change its planning objective. A choice could depend either from schedule or fuel saving benefits, depending on the situation.

For any of the manually or automatically initiated re-plans, the control algorithm may determine and present more than one trip plan to the operator. According to one embodiment, the control algorithm may determine and present different power source selection schedules to the operator, allowing the operator to select the arrival time and understand the corresponding fuel and/or emission impact. Such information can also be provided to the dispatch for similar consideration, either as a simple list of alternatives or as a plurality of tradeoff curves.

According to one embodiment, the computer may learn and adapt to changes in the hybrid propulsion system and the vehicle system which can be incorporated in the current trip plan and/or for future trip plans. For example, one change may be a loss of power. When building up power over time, either after a loss of power or when beginning a trip, transition logic is utilized to determine when desired power is achieved.

Regardless of the combination of objective functions established and the combination of performance parameters of the hybrid propulsion system used to optimize a trip plan, total fuel efficiency may be improved by encouraging regenerative braking to occur during portions of the route. Thus, when planning a trip power source selection schedule, when revising an existing trip plan or completely re-planning, or when adjusting the plan, an optimized trip power source selection schedule may be obtained as outlined in FIG. 3.

Figure 5:
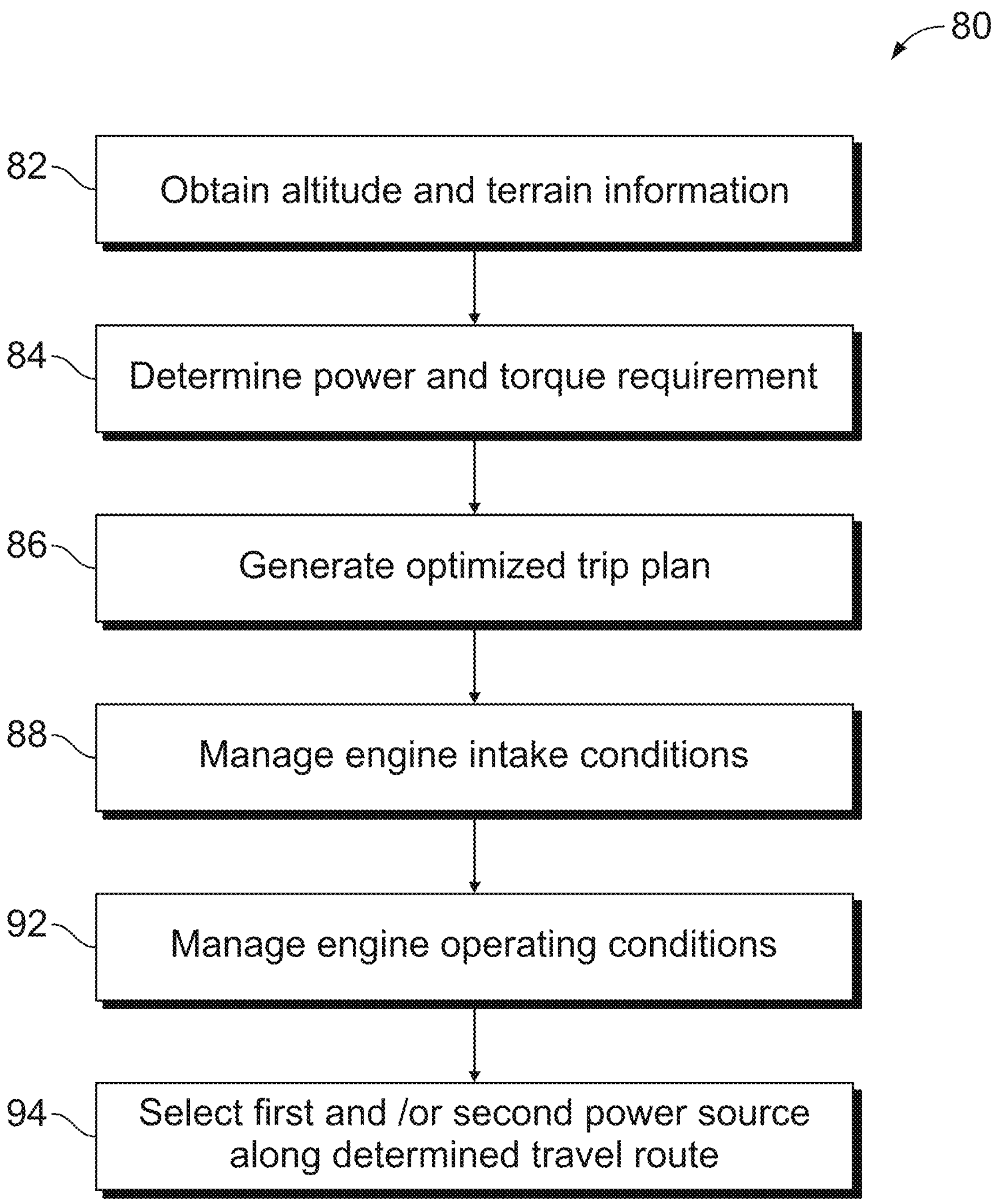
FIG. 5 schematically illustrates a method according to one embodiment.

Referring to FIG. 5, a method 80 of controlling a hybrid propulsion system according to one embodiment begins with a step 82 of obtaining altitude and terrain information of a determined travel route for a vehicle system including a hybrid propulsion system, for example as illustrated in FIG. 1 or FIG. 2. The method includes a step 84 of determining a power requirement and a torque requirement associated with low temperature combustion conditions along the determined travel route. According to one embodiment, the power and torque requirements associated with given locations along the determined travel route are determined in order to maintain a given total trip time. According to one embodiment, the power requirement(s) associated with the low temperature combustion condition may be a current power requirement. According to one embodiment, the power requirement(s) associated with the low temperature combustion condition may be a forecast or predicted power requirement(s). According to one embodiment, the torque requirement(s) associated with the low temperature combustion condition may be a current torque requirement (s). According to one embodiment, the torque requirement(s) associated with the low temperature combustion condition may be a forecast or predicted torque requirement(s).

The method includes a step 86 of generating a trip plan that optimizes one or more performance parameters to stabilize low temperature combustion conditions in the hybrid propulsion system as the vehicle system travels along the predetermined travel route. The step of generating the trip play may include generating the trip power source selection schedule. The method includes a step 88 of managing engine intake conditions. The engine intake conditions include intake composition, intake pressure, and intake temperature. The method includes a step 92 of managing engine operating conditions. The engine operating conditions include total trip time, fueling rate, and engine speed.

The method includes a step 94 of selecting the first power source (e.g., the ICE) and/or the second power source (e.g., the battery) as the source of required power and/or torque based on the optimized trip plan. The selection of the first power source and/or the second power source may be according to the trip power source selection schedule. The first power source may be selected to provide a first percentage of the required power and/or torque and the second power source may be selected to provide a second percentage of the required power and/or torque. The first percentage and the second percentage provide one hundred percent of the required power and/or torque. According to one embodiment, the trip plan includes conditions (e.g., required power and/or torque) that permit operation of the first power source (ICE) of the hybrid propulsion system in low temperature combustion and selecting the first power source and/or the second power source includes selecting the first power source to operate in stable low temperature combustion and provide a first percentage of the required power and/or torque and selecting the second power source to provide a second percentage of the required power and/or torque.

According to one embodiment, managing performance parameters may include managing propulsion-generating vehicle power data, regenerative braking characteristics, performance of propulsion-generating vehicle traction transmission, consumption of engine fuel as a function of output power, and cooling characteristics of the hybrid propulsion system, as examples. Route data obtained may include a single leg from a first point to a second point, or multiple legs between points. The route data obtained may include altitude and terrain, or grade information that is extracted and used to optimize the trip plan.

According to one embodiment, the method includes obtaining a number of objective trip criteria which constrain the optimization. The objective trip criteria may include, but are not limited to, total trip time, a maximum power setting, a speed limit, an exhaust emission, and a throttle jockeying of the hybrid propulsion system. The trip plan may also be generated and optimized by encouraging or promoting regenerative braking to occur to optimize power stored in the battery. Such optimization may occur irrespective of momentum or braking requirements of the hybrid propulsion system during periods of the trip. In other words, the optimized trip plan may call for accelerating on flat portions of a route via the ICE or may call for accelerating going up a hill via the ICE, such that energy may be regeneratively recovered during, for instance, downslopes or downgrades along the route. The optimized trip plan may also include drawing down the battery during portions of the trip such that adequate storage capacity is available in the battery in advance of a regenerative braking period. Thus, a total trip may be optimized about fuel consumption, and overall fuel efficiency may be improved by generating a trip plan that encourages regenerative braking to occur during portions of the trip that otherwise would not have regenerative braking, all while satisfying the objective trip criteria.

According to one embodiment, the method includes preferentially selecting the engine and/or the battery as potential source of required power and/or torque based on the optimized trip plan. The battery enables the engine to operate at constant speed and/or constant power, while the intake conditions remain constant. According to one embodiment, instead of operating at discrete power notch settings, the computer is configured to select a continuous power setting determined as optimal for the power source selection schedule selected.

Controlling the hybrid propulsion system according to one embodiment includes revising an existing trip plan or generating a new trip plan based on low temperature combustion conditions that occur while the propulsion system is traveling from one point to another along its determined travel route. According to one embodiment, the hybrid propulsion system is provided on a locomotive and the control method may be adapted accordingly.

According to one embodiment, a remote facility, such as a dispatch or a central or wayside location, can provide the altitude and terrain information and the low temperature combustion information may be obtained from a computer that is remotely located from the hybrid propulsion system. The information may be provided to the controller or the computer.

According to one embodiment, the controller may be supplied with a locomotive modeling information database, information from a track database such as, but not limited to, track grade information and speed limit information, estimated train parameters such as, but not limited to, train weight and drag coefficients, fuel rate tables from a fuel rate estimator, and battery models that describe battery efficiency and recovery of energy during, for instance, regenerative braking.

In practice, typically, the controller supplies information to a planner, and a trip plan is calculated accordingly. Once a trip plan has been calculated, the plan is supplied to a driving advisor, driver or controller. The controller is coupled to a battery management module that controls charging and discharging of the bank of batteries according to the trip plan as executed by the controller. The trip plan is also supplied to the controller so that it can compare the trip when other new data is provided.

According to one embodiment, the controller can automatically set a notch power, either a pre-established notch setting or an optimum continuous notch power. In addition to supplying a speed command to the hybrid propulsion system, a display is provided so that the operator can view what the planner has recommended. The operator also has access to a control panel. Through the control panel, the operator can decide whether to apply the notch power recommended. Toward this end, the operator may limit a targeted or recommended power. That is, at any time the operator always has final authority over what power setting the locomotive consist will operate at. This includes deciding whether to supply the required power and/or the torque to the hybrid propulsion system from the engine or the batteries under varying low temperature combustion conditions arising from operating in cold or hot territories. Further, where information from wayside equipment cannot electronically transmit information to the vehicle system and instead the operator views visual signals from the wayside equipment, the operator inputs commands based on information contained in the track database and visual signals from the wayside equipment.

Based on how the hybrid propulsion system is functioning, information regarding fuel measurement is supplied to the fuel rate estimator. Since direct measurement of fuel flows is not typically available in a locomotive consist, information on fuel consumed within a trip, and projections into the future following optimal plans, is carried out using calibrated physics models such as those used in developing the optimal plans. For example, such predictions may include but are not limited to the use of measured gross horse-power and known fuel characteristics to derive the cumulative fuel used.

According to one embodiment, the hybrid propulsion system may have an exemplary locator element, such as a GPS sensor and location information can be supplied to a parameters estimator. Such information may include, but is not limited to, GPS sensor data, tractive/braking effort data, braking status data, speed and any changes in speed data. With information regarding grade and speed limit information, vehicle system weight and drag coefficients information is supplied to the controller.

According to one embodiment, the computer may also allow for the use of continuously variable power throughout the optimization planning and closed loop control implementation. In a conventional locomotive, power is typically quantized to eight discrete levels. Modem locomotives can realize continuous variation in horsepower which may be incorporated into the previously described optimization methods. With continuous power, the hybrid propulsion system can further optimize operating conditions, e.g., by minimizing auxiliary loads and power transmission losses, and fine-tuning engine horsepower regions of optimum efficiency, or to points of increased emissions margins. Examples include, but are not limited to, minimizing cooling system losses, adjusting alternator voltages, adjusting engine speeds, and reducing number of powered axles. Further, the hybrid propulsion system may use the track database and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

According to one embodiment, the computer may use the track database and the forecasted performance to adjust the locomotive performance, such as to ensure that the train has sufficient speed as it approaches a hill and/or tunnel. For example, this could be expressed as a speed constraint at a particular location that becomes part of the optimal plan. Additionally, the control algorithm may incorporate train-handling rules, such as, but not limited to, tractive effort ramp rates, maximum braking effort ramp rates. These may be incorporated directly into the formulation for optimum trip power source selection schedule or alternatively incorporated into the closed loop regulator used to control power application to achieve the target speed.

According to one embodiment, the control algorithm is only installed on a lead locomotive of the train consist. However, interaction with multiple trains is not precluded and two or more independently optimized trains may be controlled according to the invention.

Trains with distributed power systems can be operated in several different modes. One mode is where all locomotives in the train operate at the same notch command Thus, if the lead locomotive is commanding motoring-N8, all units in the train will be commanded to generate motoring-N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics-based planning model, train set-up information, on-board track database, on-board operating rules, location determination system, real-time closed loop power/brake control, and sensor feedback, the system shall automatically operate the distributed power system in "independent" mode.

When operating in distributed power, the operator in a lead locomotive can control operating functions of remote locomotives in the remote consists via a control system, such as a distributed power control element. Thus, when operating in distributed power, the operator can command each locomotive consist to operate at a different notch power level (or one consist could be in motoring and other could be in braking) wherein each individual locomotive in the locomotive consist operates at the same notch power. According to one embodiment, with the control algorithm installed on the train, preferably in communication with the distributed power control element, when a notch power level for a remote locomotive consist is desired as recommended by the optimized trip plan, the control algorithm will communicate this power setting to the remote locomotive consists for implementation. The same is true regarding braking.

The control algorithm may be used with consists in which the locomotives are not contiguous, e.g., with one or more locomotives up front, others in the middle and at the rear for train. Such configurations are called distributed power wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

According to one embodiment, when a notch power level for a remote locomotive consist is desired as recommended by the trip plan, the control algorithm will communicate this power setting to the remote locomotive consists for implementation. The same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, the operation may include the use of multiple throttle controls to better manage in-train forces as well as fuel consumption and emissions. According to one embodiment, a trip optimization algorithm integrating allowances for low temperature combustion conditions enhances overall fuel efficiency by, for example, supply power from engine to one locomotive while simultaneously supplying from the batteries to another.

According to one embodiment, in a train utilizing a consist manager, the lead locomotive in a locomotive consist may operate at a different notch power setting than other locomotives in that consist. The other locomotives in the consist operate at the same notch power setting. The computer may be utilized in conjunction with the consist manager to command notch power settings and regenerative braking commands for the locomotives in the consist. Thus, because the consist manager divides a locomotive consist into two groups, lead locomotive and trail units, the lead locomotive will be commanded to operate at a certain notch power and the trail locomotives will be commanded to operate at another certain notch power. According to one embodiment, the distributed power control element may be the system and/or apparatus where this operation is housed.

Likewise, when a consist optimizer is used with a locomotive consist, the control algorithm can be used in conjunction with the consist optimizer to determine notch power for each locomotive in the locomotive consist, thus providing the overall required net power. For example, suppose that a trip plan recommends a notch power setting of 4 for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

According to one embodiment, the trip optimizer algorithm described herein may, for periods of the trip, force the engine to operate in less efficient modes (such as a peak power of the ICE in conjunction with drawing from the battery). Such operation may be to make up for lost time or to provide additional acceleration capability than can be provided by the internal combustion engines alone. However, although short periods of decreased efficiency may occur, overall efficiency is improved, as the trip optimizer takes full account of combined efficiencies during the planned trip.

According to one embodiment, the control algorithm may be used for continuous corrections and revision of an existing trip plan or complete re-planning with respect to when the train consist uses which source of power based on upcoming items of interest, such as but not limited to railroad crossings, grade changes, approaching sidings, approaching depot yards, and approaching fuel stations where each locomotive in the consist may require a different braking option. For example, if the train is coming over a hill (at higher altitude and usually lower temperature, with possible exceptions), the lead locomotive may be supplied with power from the batteries whereas the remote locomotives, having not reached the peak of the hill may have to remain in a motoring state and supplied with power from the engine.

A technical contribution for the disclosed system is a computer configured to operate a hybrid propulsion system and access a navigation database system and to a method of using the system.

A system may include a computer to obtain orientation information associated with a determined travel route for a vehicle system including a first power source and a second power source and determine one or more energy requirements of a hybrid propulsion system of the vehicle system. The one or more energy requirements may be based on the orientation information of the determined travel route. The computer may generate a trip plan used by the vehicle system to control one or more performance parameters of the hybrid propulsion system and control a stable low temperature combustion in the hybrid propulsion system as the vehicle system travels along the determined travel route and select at least one of the first power source or the second power source to deliver the one or more energy requirements of the hybrid propulsion system based on the trip plan.

The system of claim 1, wherein the one or more performance parameters comprise engine operating conditions that include one or more of a total trip time, a fueling rate, or an engine speed.

The one or more performance parameters may include intake conditions including one or more of intake composition, intake pressure, or intake temperature.

The computer may generate the trip plan based on one or more of (a) a first rate of power output from the first power source and a second rate of power output from the second power source, (b) hybrid propulsion power data, (c) performance of a vehicle traction transmission, (d) a cooling characteristic of the hybrid propulsion system, (e) a first life of the first power source, (f) a second life of the second power source, (g) a state of charge of the first power source or the second power source, (h) a total trip time, (i) a maximum power setting, (j) a speed limit, or (k) an exhaust emission of the hybrid propulsion system.

The computer may revise the trip plan based on one or more variations in the one or more energy requirements while the vehicle system is moving.

The computer may obtain the orientation information and determine the one or more energy requirements using a second computer that is remotely located from the hybrid propulsion system.

The first energy source may be an engine and the second energy source may include one or more batteries.

The computer may control the one or more batteries to enable the engine to operate at one or more of a constant speed or a constant power, with constant intake conditions.

A method of controlling a hybrid propulsion system of a vehicle system may include obtaining orientation information associated with a determined travel route for the vehicle system. The vehicle system may include a first power source and a second power source. The method may include determining one or more energy requirements of a hybrid propulsion system of the vehicle system. The one or more energy requirements may be based on the orientation information of the determined travel route. The method may include generating a trip plan used by the vehicle system to control one or more performance parameters of the hybrid propulsion system and to control a stable low temperature combustion in the hybrid propulsion system as the vehicle system travels along the determined travel route. The method may include selecting at least one of the first power source or the second power source to deliver the one or more energy requirements of the hybrid propulsion system based on the trip plan.

The one or more performance parameters may include engine operating conditions that include one or more of a total trip time, a fueling rate, or an engine speed.

The one or more performance parameters may include intake conditions including one or more of intake composition, intake pressure, or intake temperature.

Generating the trip plan may include generating the trip plan based on one or more of (a) a first rate of power output from the first power source and a second rate of power output from the second power source, (b) hybrid propulsion power data, (c) performance of a vehicle traction transmission, (d) a cooling characteristic of the hybrid propulsion system, (e) a first life of the first power source, (f) a second life of the second power source, (g) a state of charge of the first power source or the second power source, (h) a total trip time, (i) a maximum power setting, (j) a speed limit, or (k) an exhaust emission of the hybrid propulsion system.

The method may include revising the trip plan based on one or more variations in the one or more energy requirements while the vehicle system is moving.

Obtaining the orientation information and determining the one or more energy requirements may include obtaining the orientation information and determining the one or more energy requirements using a computer that is remotely located from the hybrid propulsion system.

The first energy source may be an engine and the second energy source include one or more batteries. The method may include controlling the or more batteries to enable the engine to operate at one or more of a constant speed or a constant power, with constant intake conditions.

A vehicle system may include a hybrid power source to provide power to drive the vehicle system via a power transmission line. The hybrid power source may include an internal combustion engine and one or more batteries. The internal combustion engine and the one or more batteries may be coupled to the power transmission line. The vehicle system may include one or more electric motors connected to the power transmission line, a selection device to selectively couple the one or more electric motors to the power transmission line, and a computer. The computer may obtain orientation information associated with a determined travel route and determine one or more energy requirements of the hybrid power source associated with the orientation information of the determined travel route. The computer may generate a trip plan used by the vehicle system to control one or more performance parameters of the hybrid power source and to control a stable low temperature combustion in the hybrid power source as the vehicle system travels along the determined travel route. The computer may select at least one of the first power source or the second power source to deliver the one or more energy requirements of the hybrid power source based on the trip plan.

The one or more performance parameters may include one or more of (a) engine operating conditions including one or more of a total trip time, a fueling rate, or an engine speed or (b) intake conditions including one or more of intake composition, intake pressure, or intake temperature.

The computer may generate the trip plan based on one or more of (a) a first rate of power output from the internal combustion engine and a second rate of power output from the one or more batteries, (b) hybrid power source data, (c) performance of a vehicle traction transmission, (d) a cooling characteristic of the hybrid power source, (e) a first life of the internal combustion engine, (f) a second life of the one or more batteries, (g) a state of charge of the one or more batteries, (h) a total trip time, (i) a maximum power setting, (j) a speed limit, or (k) an exhaust emission of the internal combustion engine.

The computer may revise the trip plan based on one or more variations in the one or more energy requirements while the vehicle system is moving.

The computer may be a first computer that obtains the orientation information and determines the one or more energy requirements using a second computer that is remotely located from the vehicle system As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms “a”, “an”, and “the” include plural references unless the context clearly dictates otherwise. “Optional” or “optionally” means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as “about,” “substantially,” and “approximately,” may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising a computer programmed to:

obtain orientation information associated with a determined travel route for a vehicle system comprising a hybrid propulsion system, the hybrid propulsion system comprising an engine and a plurality of batteries;

determine one or more energy requirements of the hybrid propulsion system, the one or more energy requirements based at least in part on the orientation information of the determined travel route;

generate a trip plan of the vehicle system comprising a schedule for controlling an output of one or more batteries of the plurality of batteries such that the engine operates at a constant speed, a constant power, or both, while intake conditions of the hybrid propulsion system remain constant, the schedule being based at least in part on the one or more energy requirements; and execute the trip plan as the vehicle system travels along the determined travel route to yield a stable low temperature combustion in the hybrid propulsion system;

wherein the orientation information comprises at least one of altitude information, terrain information, or grade information of the determined travel route.

2. The system of claim 1, wherein the trip plan is generated to further control one or more performance parameters of the hybrid propulsion system, the one or more performance parameters comprising engine operating conditions that include one or more of a total trip time, a fueling rate, or an engine speed.

3. The system of claim 1, wherein the trip plan is generated to further control one or more performance parameters of the hybrid propulsion system, the one or more performance parameters comprising intake conditions comprising one or more of intake composition, intake pressure, or intake temperature.

4. The system of claim 1, wherein the computer is programmed to generate the trip plan based on one or more of (a) a first rate of power output from the engine and a second rate of power output from the plurality of batteries, (b) hybrid propulsion power data, (c) performance of a vehicle traction transmission, (d) a cooling characteristic of the hybrid propulsion system, (e) a first life of the engine, (f) a second life of the plurality of batteries, (g) a state of charge of the plurality of batteries, (h) a total trip time, (i) a maximum power setting, (j) a speed limit, or (k) an exhaust emission of the hybrid propulsion system.

5. The system of claim 1, wherein the computer is further programmed to revise the trip plan based on one or more variations in the one or more energy requirements while the vehicle system is moving.

6. The system of claim 1, wherein the computer is programmed to obtain the orientation information and determine the one or more energy requirements using a second computer that is remotely located from the hybrid propulsion system.

7. A method of controlling a hybrid propulsion system of a vehicle system, comprising:

obtaining orientation information associated with a determined travel route for the vehicle system;

determining one or more energy requirements of the hybrid propulsion system of the vehicle system, wherein the hybrid propulsion system comprises an engine and a plurality of batteries and wherein the one or more energy requirements are based on the orientation information of the determined travel route;

generating a trip plan of the vehicle system comprising a schedule for controlling an output of one or more batteries of the plurality of batteries such that the engine operates at a constant speed, a constant power, or both, while intake conditions of the hybrid propulsion system remain constant, the schedule being based at least in part on the one or more energy requirements; and executing the trip plan as the vehicle system travels along the determined travel route to yield a stable low temperature combustion in the hybrid propulsion system;

wherein the orientation information comprises at least one of altitude information, terrain information, or grade information of the determined travel route.

8. The method of claim 7, wherein the trip plan is generated to further control one or more performance parameters of the hybrid propulsion system, the one or more performance parameters comprising engine operating conditions that include one or more of a total trip time, a fueling rate, or an engine speed.

9. The method of claim 7, wherein the trip plan is generated to further control one or more performance parameters of the hybrid propulsion system, the one or more performance parameters comprising intake conditions comprising one or more of intake composition, intake pressure, or intake temperature.

10. The method of claim 7, wherein generating the trip plan comprises generating the trip plan based on one or more of (a) a first rate of power output from the engine and a second rate of power output from the plurality of batteries, (b) hybrid propulsion power data, (c) performance of a vehicle traction transmission, (d) a cooling characteristic of the hybrid propulsion system, (e) a first life of the engine, (f) a second life of the plurality of batteries, (g) a state of charge of the plurality of batteries, (h) a total trip time, (i) a maximum power setting, (j) a speed limit, or (k) an exhaust emission of the hybrid propulsion system.

11. The method of claim 7, further comprising:
revising the trip plan based on one or more variations in the one or more energy requirements while the vehicle system is moving.

12. The method of claim 7, wherein obtaining the orientation information and determining the one or more energy requirements comprises obtaining the orientation information and determining the one or more energy requirements using a computer that is remotely located from the hybrid propulsion system.

13. A vehicle system comprising:
a hybrid power source to provide power to drive the vehicle system via a power transmission line, the hybrid power source comprising an internal combustion engine and one or more batteries, wherein the internal combustion engine and the one or more batteries are coupled to the power transmission line;
one or more electric motors connected to the power transmission line;
a selection device configured to selectively couple the one or more electric motors to the power transmission line; and
a computer configured to:
obtain orientation information associated with a determined travel route;
determine one or more energy requirements of the hybrid power source associated with the orientation information of the determined travel route;
generate a trip plan used by the vehicle system comprising a schedule for controlling an output of the one or more batteries such that the internal combustion engine operates at a constant speed, a constant power, or both, while intake conditions of the hybrid power source remain constant, the schedule being based at least in part on the one or more energy requirements; and
execute the trip plan as the vehicle system travels along the determined travel route to yield a stable low temperature combustion in the hybrid power source;
wherein the orientation information comprises at least one of altitude information, terrain information, or grade information of the determined travel route.

14. The vehicle system of claim 13, wherein the trip plan is generated to further control one or more performance parameters of the hybrid power source, the one or more performance parameters comprising one or more of (a) engine operating conditions comprising one or more of a total trip time, a fueling rate, or an engine speed or (b) intake conditions comprising one or more of intake composition, intake pressure, or intake temperature.

15. The vehicle system of claim 13, wherein the computer is programmed to generate the trip plan based on one or more of (a) a first rate of power output from the internal combustion engine and a second rate of power output from the one or more batteries, (b) hybrid power source data, (c) performance of a vehicle traction transmission, (d) a cooling characteristic of the hybrid power source, (e) a first life of the internal combustion engine, (f) a second life of the one or more batteries, (g) a state of charge of the one or more batteries, (h) a total trip time, (i) a maximum power setting, (j) a speed limit, or (k) an exhaust emission of the internal combustion engine.

16. The vehicle system of claim 13, wherein the computer is further programmed to revise the trip plan based on one or more variations in the one or more energy requirements while the vehicle system is moving.

17. The vehicle system of claim 13, wherein the computer is a first computer programmed to obtain the orientation information and determine the one or more energy requirements using a second computer that is remotely located from the vehicle system.

* * * * *